United States Patent Office 2,696,661
Patented Dec. 14, 1954

2,696,661

ARTICLE OF MANUFACTURE

Philip R. Kalischer, Wilkinsburg, Pa., assignor to Westinghouse Electric Corporation, East Pittsburgh, Pa., a corporation of Pennsylvania No Drawing. Application July 20, 1944,
Serial No. 545,883

7 Claims. (Cl. 29—182.5)

This invention relates to the making of uranium members, more particularly uranium members or electrodes adapted for use in the ionic centrifuge disclosed in the copending patent application of Joseph Slepian, Serial No. 519,185, filed January 21, 1944, and assigned to the Westinghouse Electric & Manufacturing Company.

The ionic centrifuge requires for its successful functioning members or electrodes providing a source of uranium. For such use, it is required that the members possess predetermined electrical resistance characteristics. Furthermore, the members must have good mechanical strength.

An object of this invention is to provide a process for treating compounds of uranium to produce therefrom uranium dioxide.

A further object of the invention is to provide for combining uranium metal and uranium dioxide and to produce therefrom members having predetermined strength and electrical properties adapted to use in an ionic centrifuge.

A still further object of the invention is to provide a uranium electrode suitable for use in an ionic centrifuge.

Other objects of the invention will in part be obvious and will in part appear hereinafter.

A highly purified uranium oxide is required for best results in the ionic centrifuge. The preparation of the compound has been found to be most readily effected by employing sodium uranate as the starting material. While theoretically sodium uranate is capable of being decomposed by calcination in a refractory crucible in an oxygen atmosphere, it has been found that the sodium oxides and uranium oxide produced during decomposition exert a strongly fluxing action on the refractory crucible and thereby produce an impure product.

According to the present invention, sodium uranate ($Na_2UO_4$) is converted to ammonium uranate $$(NH_4)_2UO_4$$

by dissolving sodium uranate in nitric acid and precipitating ammonium uranate by the addition of ammonium hydroxide. The filtered ammonium uranate precipitate is dried and, when placed within a refractory crucible, it may be safely calcined without attacking such crucible. The calcination is preferably carried out in the atmosphere or in a controlled oxygen atmosphere at temperatures of the order of 1400° C. for several hours. The reaction is carried to completion in the period of time from 8 to 16 hours. Ammonium uranate decomposes readily with evolution of volatile gases to form uranium oxide ($U_3O_8$).

The calcined product, uranium oxide, is a hard black cinder and no evidence of attack on the crucible is evident. For subsequent use, the black cinder is ground and screened to produce a predetermined powder. A powder 100 mesh or finer is suitable in the process of producing members for the ionic centrifuge.

The uranium oxide has an extremely high electrical resistance, and accordingly the average ion current is low and thereby the efficiency of the ionic centrifuge with members composed entirely of uranium oxides is correspondingly low.

According to the invention, bars having properties more suitable for application in the ionic centrifuge in regard to electrical resistance and mechanical strength are prepared by combining uranium dioxide ($UO_2$) with uranium metal in a finely divided state. In order to prepare uranium dioxide, the finely powdered uranium oxide prepared by the process described above is subjected to reduction in a hydrogen atmosphere dried to a dew point of about —20° C. or lower at a temperature of from about 1000° C. to 1400° C. Quantitative reduction of the uranium oxide takes place under these conditions. The powdered uranium oxide is placed in a boat or shallow dish in a controlled atmosphere type of furnace with hydrogen having a low dew point being introduced. The process of reduction is quite rapid at a temperature of 1200° C. The uranium dioxide powder must be cooled to below 150° C. in the presence of hydrogen in order to avoid reoxidation to the higher oxides. It has been found that even a fraction of a per cent of oxides higher than uranium dioxide is detrimental.

As an example of the practice of the invention, finely divided uranium metal, preferably 200 mesh or finer, is admixed with the uranium dioxide powder in the proportion of 40 parts by weight of metallic uranium to 60 parts by weight of the uranium dioxide. While the proportions of uranium metal and uranium dioxide may be varied to meet requirements of different applications, for the purpose of the present invention the metallic uranium should not exceed the weight of the uranium dioxide if a suitable electrical resistance for efficient ionic centrifuge use is to be maintained. The metallic uranium and uranium dioxide are thoroughly mixed to secure a uniform blend. The blended powders are placed in a predetermined mold and pressed at pressures of the order of 100 tons per square inch. Members so produced are sintered at temperatures of over 1000° C. in a high vacuum. The degree of vacuum is of the order of $10^{-3}$ mm. of mercury. One hour at a temperature of 1100° C. has been found to produce a bar or other member characterized by good mechanical strength.

The electrical resistance properties of the bar composed of approximately 40% uranium metal and 60% uranium dioxide is 1300 microhm centimeters. This resistance has been found to give a high efficiency in the ionic centrifuge. Electrodes produced according to the present invention have been employed in the ionic centrifuge with highly satisfactory results.

The presence of oxides of uranium higher than uranium dioxide is to be avoided. Mixtures having about 1% $U_3O_8$, for example, when sintered were so weak that they could not be handled without crumbling. Even smaller amounts of the higher oxides resulted in significant loss of mechanical properties.

A microscopic examination of a sintered bar made as above described discloses a uniform distribution of metal in an oxide matrix without the metal particles forming a continuous network. Such structure is highly desirable since the predetermined resistance required by the application is achieved by this type of relationship between the metal and the metal dioxide.

Since certain changes in carrying out the above process and certain modifications in the article which embody the invention may be made without departing from its scope, it is intended that all matter contained in the above description shall be interpreted as illustrative and not in a limiting sense.

I claim as my invention:

1. A member usable in an ionic centrifuge composed of from a substantial proportion to less than 50% by weight of uranium metal and the balance being substantially all uranium dioxide.

2. A member usable in an ionic centrifuge composed of from a substantial proportion to less than 50% by weight of uranium metal and the balance being substantially all uranium dioxide, the uranium metal being distributed in a matrix composed of the uranium dioxide without continuous contact between the particles of the uranium metal whereby to provide for a predetermined electrical resistance.

3. A member suitable for use in an ionic centrifuge composed of about 40% by weight of uranium metal and the balance composed of uranium oxide, the uranium oxide being substantially all uranium dioxide.

4. A member having predetermined electrical resistance and strength composed of substantially only metallic uranium and uranium dioxide in predetermined proportions.

5. The method of producing a member suitable for use in an ionic centrifuge which comprises subjecting powdered uranium oxide to a hydrogen atmosphere at temperatures of from about 1200° C. to 1500° C. to produce uranium dioxide, combining the uranium dioxide with powdered uranium metal in predetermined proportions by thorough mixing, compressing the mixture into a predetermined shape and sintering in a high vacuum at a temperature of the order of 1000° C.

6. In the process of producing members of uranium dioxide, the steps of calcining ammonium uranate in the presence of oxygen at a temperature about 1400° C. to produce uranium oxide and subjecting the uranium oxide to an atmosphere of hydrogen gas at temperatures of from about 1200° C. to 1500° C. to produce uranium dioxide.

7. In the process of preparing uranium members, the steps comprising calcining ammonium uranate in an oxygen atmosphere at temperatures of above about 1100° C. to produce uranium oxide, pulverizing to uranium oxide to a finely divided state, subjecting the finely divided uranium oxide to the action of hydrogen at a temperature of from about 1000° C. to 1400° C. to produce uranium dioxide, admixing the uranium dioxide with finely divided uranium metal in predetermined proportions, applying pressure to the mixture to compact it into desired shape and sintering the compact in a vacuum of less than one millimeter of mercury and at a temperature of above about 1000° C. to provide for a member of high mechanical strength and a predetermined electrical resistance.

<center>No references cited.</center>